US011096180B2

(12) United States Patent
Baldemair et al.

(10) Patent No.: US 11,096,180 B2
(45) Date of Patent: *Aug. 17, 2021

(54) SELECTION OF TIME-DOMAIN RESOURCE ALLOCATION TABLES

(71) Applicant: Telefonaktiebolaget LM Ericsson (publ), Stockholm (SE)

(72) Inventors: Robert Baldemair, Solna (SE); Jung-Fu Cheng, Fremont, CA (US); Daniel Larsson, Lund (SE); Ravikiran Nory, Buffalo Grove, IL (US); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,275

(22) Filed: Dec. 4, 2020

(65) Prior Publication Data
US 2021/0153206 A1    May 20, 2021

Related U.S. Application Data

(63) Continuation of application No. 16/848,187, filed on Apr. 14, 2020, now Pat. No. 10,939,450, which is a (Continued)

(51) Int. Cl.
*H04W 72/04*    (2009.01)
*H04L 5/00*    (2006.01)
(Continued)

(52) U.S. Cl.
CPC ....... *H04W 72/0493* (2013.01); *H04L 5/0053* (2013.01); *H04L 5/0082* (2013.01);
(Continued)

(58) Field of Classification Search
CPC ........... H04W 72/0493; H04W 72/042; H04W 72/0453; H04W 76/27; H04W 72/0446;
(Continued)

(56) References Cited

U.S. PATENT DOCUMENTS 9,769,862 B2    9/2017    Sheng
2014/0086112 A1    3/2014    Stern Berkowitz
(Continued)

FOREIGN PATENT DOCUMENTS

KR    20160118905 A    10/2016
RU    2595518 C2    8/2016

OTHER PUBLICATIONS

International Search Report dated Jan. 21, 2019 for corresponding PCT/SE2018/051183 international application.
(Continued)

*Primary Examiner* — Ivan O Latorre
(74) *Attorney, Agent, or Firm* — Baker Botts, LLP

(57) ABSTRACT

According to certain embodiments, a user equipment, UE, is operable for multiple sub-carrier spacing values. The UE comprises memory operable to store instructions and processing circuitry operable to execute the instructions, whereby the UE is operable to determine one of a plurality of time-domain resource allocation tables based on first information received from a network node. The first information comprises a Radio Network Temporary Identifier, RNTI. The UE is operable to determine a time-domain resource allocated to the UE for transmission or reception of a wireless signal based on the determined one of the plurality of time-domain resource allocation tables and second information received from the network node. The second information comprises a time-domain resource allocation field value received in downlink control information, DCI. The UE is further operable to transmit or receive the wireless signal using the determined time-domain resource.

22 Claims, 12 Drawing Sheets

Related U.S. Application Data continuation of application No. 16/193,063, filed on Nov. 16, 2018, now Pat. No. 10,645,701.

(60) Provisional application No. 62/587,524, filed on Nov. 17, 2017.

(51) Int. Cl.
  *H04W 76/11* (2018.01)
  *H04W 76/27* (2018.01)

(52) U.S. Cl.
  CPC ......... *H04L 5/0094* (2013.01); *H04W 72/042* (2013.01); *H04W 72/0446* (2013.01); *H04W 72/0453* (2013.01); *H04W 76/11* (2018.02); *H04W 76/27* (2018.02); *H04L 5/0007* (2013.01)

(58) Field of Classification Search
  CPC .... H04W 76/11; H04L 5/0082; H04L 5/0094; H04L 5/0053; H04L 5/0007
  See application file for complete search history.

(56) References Cited

U.S. PATENT DOCUMENTS

| | | |
|---|---|---|
| 2014/0126531 A1 | 5/2014 | Kang |
| 2014/0153539 A1 | 6/2014 | Seo et al. |
| 2014/0321378 A1* | 10/2014 | Zhang ................... H04W 4/18 370/329 |
| 2015/0063231 A1 | 3/2015 | Seo et al. |
| 2015/0156760 A1 | 6/2015 | Yu |
| 2015/0195818 A1 | 7/2015 | Davydov |
| 2015/0264678 A1 | 9/2015 | Yin |
| 2015/0271861 A1 | 9/2015 | Li |
| 2016/0080133 A1 | 3/2016 | Golitschek Edler von Elbwart |
| 2016/0302230 A1 | 10/2016 | Novlan et al. |
| 2017/0048828 A1 | 2/2017 | Um et al. |
| 2017/0164250 A1 | 6/2017 | Kim |
| 2018/0007590 A1 | 1/2018 | Karout |
| 2018/0049169 A1 | 2/2018 | Lin |
| 2018/0175975 A1 | 6/2018 | Um et al. |
| 2018/0220400 A1 | 8/2018 | Nogami |
| 2018/0302926 A1 | 10/2018 | Bhorkar |
| 2018/0359745 A1 | 12/2018 | Yeo |
| 2018/0368142 A1 | 12/2018 | Liou |
| 2019/0037561 A1 | 1/2019 | Jung |
| 2019/0045490 A1 | 2/2019 | Davydov |
| 2019/0053227 A1 | 2/2019 | Huang |
| 2019/0053318 A1 | 2/2019 | Nogami |
| 2019/0069284 A1 | 2/2019 | Wang |
| 2019/0132882 A1 | 5/2019 | Li |
| 2019/0274094 A1 | 9/2019 | Lu |
| 2019/0297601 A1 | 9/2019 | You et al. |

OTHER PUBLICATIONS

RU Office Action for Patent Application No. 2020119779 dated Oct. 13, 2020.

* cited by examiner

SELECTION OF TIME-DOMAIN RESOURCE ALLOCATION TABLES

RELATED APPLICATIONS

This application is a continuation under 35 U.S.C. § 120 of U.S. patent application Ser. No. 16/848,187 filed on Apr. 14, 2020, which is a continuation under 35 U.S.C. § 120 of U.S. patent application Ser. No. 16/193,063 filed on Nov. 16, 2018, now U.S. Pat. No. 10,645,701, which claims priority to U.S. Provisional patent Application No. 62/587,524 filed Nov. 17, 2017, each of which is hereby incorporated by reference in its entirety.

TECHNICAL FIELD

Certain embodiments of the present disclosure relate, in general, to wireless communications and, more specifically, to the selection of time-domain resource allocation tables.

BACKGROUND

New Radio (NR) will support a bitfield in the downlink control information (DCI) to select the time-domain resource allocation for the physical uplink shared channel (PUSCH) and physical downlink shared channel (PDSCH) out of preconfigured entries in a table. Each entry in the table specifies a starting orthogonal frequency division multiplexing (OFDM) symbol and length in OFDM symbols of the allocation. Note that the starting OFDM symbol can be expressed either relative to the scheduling physical downlink control channel (PDCCH)/control channel resource set (CORESET) symbol(s) or in absolute OFDM symbol number within a slot or subframe.

SUMMARY

There currently exist certain challenge(s). Although, NR is very flexible, for example, in that NR supports different ways how to distribute system information and supports slot-based transmissions and non-slot-based transmissions, using a single time-domain resource allocation table is very limiting and can restrict scheduling in many cases. One possible solution would be to increase the resource allocation table size and by that enable more time-domain resource allocations. However, a drawback of that solution would be an increased downlink control information (DCI) size because more bits are needed to select an appropriate resource allocation.

Certain aspects of the present disclosure and their embodiments may provide solutions to these or other challenges. According to certain embodiments, a wireless device (e.g., user equipment, UE) is configured with multiple time-domain resource allocation tables. Which table to use is implicitly derived from other information available at both the network node (e.g., gNB) and the wireless device. Examples of this other information could be a Radio Network Temporary Identifier (RNTI), information contained in the DCI, which DCI format has been used for scheduling, which CORESET/search space has been used for scheduling, if the transmission is slot-based or non-slot-based, carrier aggregation related information, bandwidth part related information, slot format, and/or information indicating numerology (e.g., a cyclic prefix, an OFDM subcarrier spacing, etc.). According to certain embodiments, if the time-domain resource allocation is used in scheduling of system information (e.g., remaining minimum system information (RMSI)), the way system information is distributed (non-slot-based transmission vs. slot-based transmission) determines which table to use. According to certain embodiments, a wireless device configured with multiple time-domain resource allocation tables derives which table to use from information available at the wireless device and selects an entry out of that table based on an explicit bit field in the DCI that may be referred to as the time-domain resource allocation field.

According to certain embodiments a wireless device comprises memory and processing circuitry. The memory is operable to store instructions and the processing circuitry is operable to execute the instructions, whereby the wireless device is operable to determine one of a plurality of time-domain resource allocation tables based on first information received from a network node. Based on the determined one of the plurality of time-domain resource allocation table and second information received from the network node, the wireless device is operable to determine a time-domain resource allocated to the wireless device for transmission or reception of a wireless signal. The second information is different from the first information.

According to certain embodiments, a method performed by a wireless device comprises determining one of a plurality of time-domain resource allocation tables based on first information received from a network node. The method further comprises determining a time-domain resource allocated to the wireless device for transmission or reception of a wireless signal based on the determined one of the plurality of time-domain resource allocation tables and second information received from the network node. The second information is different from the first information.

According to certain embodiments, a computer program comprises instructions which, when executed by at least one processor of a wireless device, causes the wireless device to determine one of a plurality of time-domain resource allocation tables based on first information received from a network node and determine a time-domain resource allocated to the wireless device for transmission or reception of a wireless signal based on the determined one of the plurality of time-domain resource allocation tables and second information received from the network node. The second information is different from the first information. In some embodiments, a carrier containing the computer program is one of an electronic signal, optical signal, radio signal, or computer readable storage medium.

According to certain embodiments a wireless device is operable to determine one of a plurality of time-domain resource allocation tables based on first information received from a network node. Based on the determined one of the plurality of time-domain resource allocation table and second information received from the network node, the wireless device is operable to determine a time-domain resource allocated to the wireless device for transmission or reception of a wireless signal. The second information is different from the first information.

The above-described wireless device, method performed by a wireless device, and/or computer program may each include one or more additional features, such as any one or more of the following features:

In some embodiments, the second information comprises a time-domain resource allocation field value received in DCI.

In some embodiments, the one of the plurality of time-domain resource allocation tables determined based on the first information comprises a plurality of entries, and the second information indicates which of the plurality of entries to use to determine the time-domain resource allocated to the wireless device.

In some embodiments, the time-domain resource allocation tables comprise different combinations of starting OFDM symbol position and duration in OFDM symbols for the time-domain resource allocation.

In some embodiments, the plurality of time-domain resource allocation tables relates to time-domain resource allocation for PUSCH or for PDSCH.

In some embodiments, the plurality of time-domain resource allocation tables comprises at least one of pre-defined tables with default values for the time domain resource allocation and RRC configured tables. That is, the plurality of time-domain resource allocation tables comprises pre-defined tables with default values for the time domain resource allocation and/or RRC configured tables.

In some embodiments, the first information comprises a Radio Network Temporary Identifier, RNTI.

In some embodiments, the first information comprises information indicating a search space related to a control channel used to schedule the wireless signal.

In some embodiments, the first information comprises information related to a CORESET used to schedule the wireless signal.

In some embodiments, the first information comprises information related to bandwidth part.

In some embodiments, the first information comprises information that indicates a slot format.

In some embodiments, the first information comprises a cyclic prefix, an OFDM subcarrier spacing, or other information indicating numerology.

In some embodiments, the wireless signal is transmitted or received using the determined time-domain resource.

According to certain embodiments, a network node comprises memory and processing circuitry. The memory is operable to store instructions and the processing circuitry is operable to execute the instructions, whereby the network node is operable to determine a time-domain resource to allocate to a wireless device for transmission or reception of a wireless signal. The network node is further operable to send the wireless device first information from which the wireless device determines one of a plurality of time-domain resource allocation tables and second information from which the wireless device determines the time-domain resource based on the determined one of the plurality of time-domain resource allocation tables. The second information is different from the first information.

According to certain embodiments, method performed by a network node comprises determining a time-domain resource to allocate to a wireless device for transmission or reception of a wireless signal. The method further comprises sending the wireless device first information from which the wireless device determines one of a plurality of time-domain resource allocation tables and second information from which the wireless device determines the time-domain resource based on the determined one of the plurality of time-domain resource allocation tables. The second information is different from the first information.

According to certain embodiments, a computer program comprises instructions which, when executed by at least one processor of a network node, cause the network node to determine a time-domain resource to allocate to a wireless device for transmission or reception of a wireless signal. The instructions further cause the network node to send the wireless device first information from which the wireless device determines one of a plurality of time-domain resource allocation tables and second information from which the wireless device determines the time-domain resource based on the determined one of the plurality of time-domain resource allocation tables. The second information is different from the first information. In some embodiments, a carrier containing the computer program is one of an electronic signal, optical signal, radio signal, or computer readable storage medium.

According to certain embodiments, a network node is operable to determine a time-domain resource to allocate to a wireless device for transmission or reception of a wireless signal. The network node is further operable to send the wireless device first information from which the wireless device determines one of a plurality of time-domain resource allocation tables and second information from which the wireless device determines the time-domain resource based on the determined one of the plurality of time-domain resource allocation tables. The second information is different from the first information.

The above-described network node, method performed by a network node, and/or computer program may each include one or more additional features, such as any one or more of the following features:

In some embodiments, the second information comprises a time-domain resource allocation field value sent in DCI.

In some embodiments, the one of the plurality of time-domain resource allocation tables comprises a plurality of entries. The second information indicates which of the plurality of entries the wireless device should use to determine the time-domain resource.

In some embodiments, the time-domain resource allocation tables comprise different combinations of starting OFDM symbol position and duration in OFDM symbols for the time-domain resource allocation.

In some embodiments, the plurality of time-domain resource allocation tables relates to time-domain resource allocation for PUSCH or for PDSCH.

In some embodiments, the plurality of time-domain resource allocation tables comprises pre-defined tables with default values for the time domain resource allocation and/or RRC configured tables.

In some embodiments, the first information comprises an RNTI.

In some embodiments, the first information comprises information indicating a search space related to a control channel used to schedule the wireless signal.

In some embodiments, the first information comprises information related to a CORESET used to schedule the wireless signal.

In some embodiments, the first information comprises information related to bandwidth part.

In some embodiments, the first information comprises information that indicates a slot format.

In some embodiments, the first information comprises a cyclic prefix, an OFDM subcarrier spacing, or other information indicating numerology.

In some embodiments, the allocated time-domain resource is used to transmit or receive the wireless signal.

There are, proposed herein, various embodiments which address one or more of the issues disclosed herein. Certain embodiments may provide one or more of the following technical advantage(s). Certain embodiments allow for more flexible scheduling of time-domain resources without increasing the number of DCI bits.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in Appendix A and Appendix B.

Figure 1:
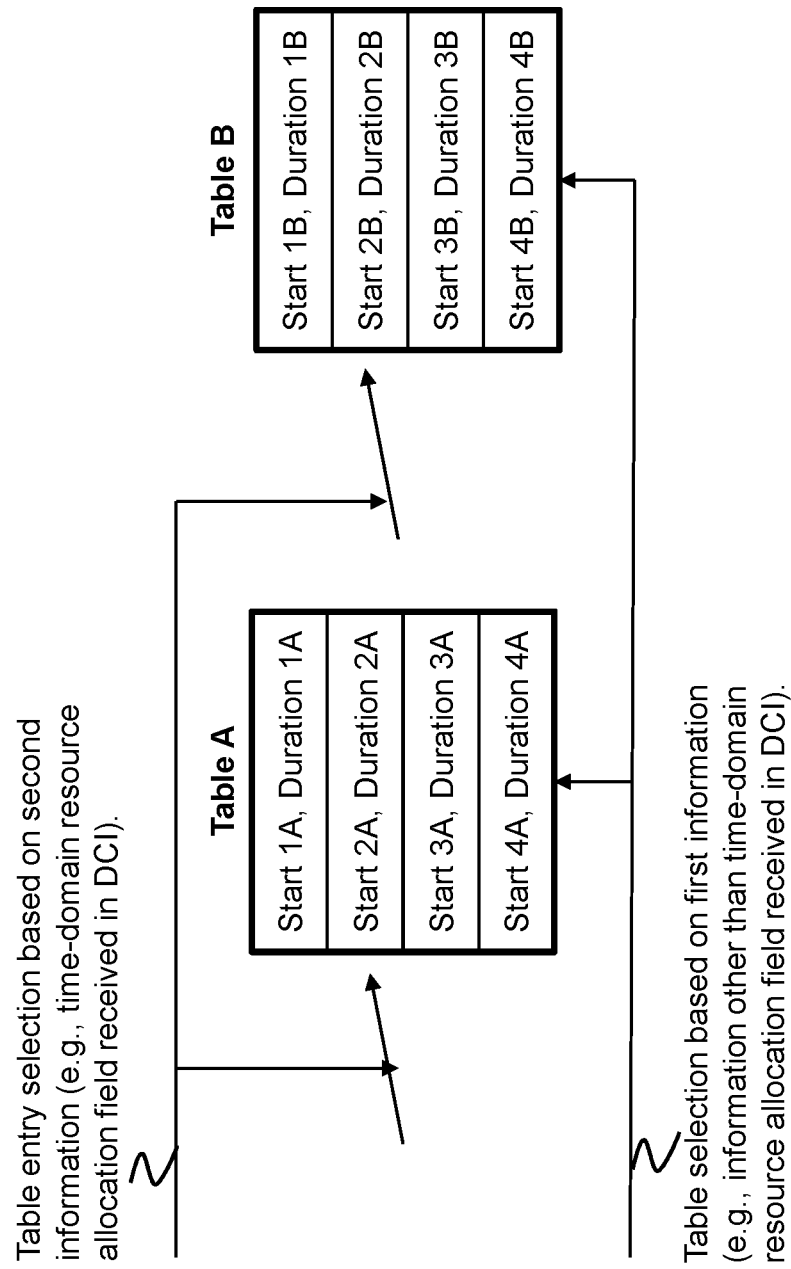
FIG. 1 illustrates an example of multiple time-domain resource allocation tables, in accordance with certain embodiments.

FIG. 1 shows a wireless device configured with multiple (in the example, two) time-domain resource allocation tables. Examples of time-domain resource allocation tables include pre-defined tables with default values for the time domain resource allocation, tables configured using RRC signaling, and a combination of pre-defined and RRC-configured tables. The time-domain resource allocation tables indicate an allocation of time-domain resources, such as time-domain resources of the PUSCH or PDSCH, for transmission or reception of a wireless signal. In some embodiments, the time-domain resource allocation tables indicate the allocation of time-domain resources with reference to OFDM symbols. For example, FIG. 1 shows that the time-domain resource allocation tables comprise different combinations of starting OFDM symbol position and duration in OFDM symbols for the time-domain resource allocation. As can be seen, the time-domain resource allocation tables include multiple entries, and the different table entries may differ in at least one of OFDM starting symbol and/or scheduled time duration in OFDM symbols. The OFDM symbols may be indicated using any two parameters selected from start symbol, stop symbol, and duration in symbols (e.g., start symbol and stop symbol, start symbol and duration, or stop symbol and duration). The start symbol can be absolute with respect to the slot boundary, or relative to a scheduling DCI/CORESET. Different tables could also have different definitions with respect to the starting (or ending) OFDM symbol. For example, some tables could express the starting (or ending) OFDM symbol in absolute OFDM symbol number of a slot while other tables would express the starting (or ending) symbol relative to PDCCH/CORESET symbol(s) used to schedule PDSCH/PUSCH. The absolute numbering could be useful for slot-based or Type A transmission while relative numbering could be preferred by non-slot-based or Type B transmission. In principle, different tables could have different number of entries; however, in the examples shown in FIG. 1, the same number of entries in each table is assumed.

The wireless device determines which time-domain resource allocation table to use based on first information received from a network node, such as a base station. The wireless device determines a time-domain resource allocated to the wireless device based on the time-domain resource allocation table determined from the first information and based on second information received from the network node. The second information is different from the first information. In some embodiments, the second information indicates which entry of the determined table to use to determine the time-domain resource allocated to the wireless device. For example, the second information may comprise a time-domain resource allocation field, such as a bit field, received in DCI. With respect to the example illustrated in FIG. 1, each table includes four entries such that a time-domain resource allocation field comprising a two bits-wide bit field may be used to select one of the four entries in the table (e.g., value "00" to select the first entry, "01" to select the second entry, "10" to select the third entry, and "11" to select the fourth entry).

As described above, the wireless device determines the table based on first information. The first information comprises information other than the time-domain resource allocation field received in the DCI. Examples of this other information could be a Radio Network Temporary Identifier (RNTI), information contained in the DCI, which DCI format has been used for scheduling, which CORESET/ search space has been used for scheduling, if the transmission is slot-based or non-slot-based, carrier aggregation related information, bandwidth part related information, slot format, and/or information indicating numerology (e.g., a cyclic prefix, an OFDM subcarrier spacing, etc.), as further described below.

In some embodiments, the first information could be another field in the DCI (i.e., a field other than the time-domain resource allocation field) that is already being signaled for another purpose. For example, if DCI includes a bit to differentiate Type A scheduling and Type B scheduling, this bit can be used to select one of the two tables in FIG. 1. Another example could be a bit that differentiates slot-based transmissions and non-slot-based transmission. Slot B scheduling, non-slot-based transmissions, and mini-slots are transmissions which duration is typically short. Slot-based transmissions typically have transmission lengths in the order of a slot. Therefore, it makes sense to use two different time-domain resource allocation tables based on a Type A/Type B or non-slot-based-transmission/slot-based-transmission differentiator bit.

If multi-slot scheduling is dynamically indicated in the DCI using a multi-slot indicator bit, this bit can be used as the first information to differentiate a time-domain resource allocation table to be used for single slot and multi-slot (slot aggregation) transmission. In these two cases resource allocations are obviously different. A multi-slot time-domain resource allocation can—in addition to the symbol information—also contain slot information. Here the time-domain resource allocation field received in DCI could be larger bit field if the multi-slot indicator bit is set to enable more time-domain resource allocations. The same principle applies if multi-slot scheduling is not indicated via a multi-slot indicator bit in the DCI but in any other way.

Certain embodiments of the present disclosure use the DCI format (e.g., regular DCI or fallback DCI) as the first information for selecting a time-domain resource allocation table. For example, for NR, it has been discussed in 3GPP to use two different DCI variants. The first variant is a regular DCI which can be used for all kinds of signaling or configuring needed. This regular DCI varies in size and format depending on its use (i.e., depending on the actual RRC configuration), somewhat similar to LTE DCI formats. The second variant is a fallback DCI with a fixed and predefined size. The fixed-size fallback DCI is typically needed during RRC reconfigurations, when there may be a period of configuration uncertainty during which it is valuable to have a fixed sized DCI known to both the network and the UE, to limit the effect of the configuration uncertainty for the wireless communication. The problem of configuration uncertainty occurs when the network does not know when the UE applies the RRC reconfiguration. For example, the UE may have to list the information, or there may be multiple retransmissions needed before the RRC command reaches the UE. Hence there is a period when the UE may have applied the new configuration, but the network is not aware of it, or vice versa. During this period there is thus a need for a way to communicate which is "always" known by both sides and, and this need is fulfilled by using the fallback DCI that is not configurable.

A wireless device can be configured with multiple control channel resource sets (CORESETS) and each CORESET can contain one or more search spaces. The CORESET and/or search space that has been used to schedule the transmission can be used as the first information for determining the time-domain resource allocation table.

A DCI contains a downlink/uplink (DL/UL) indicator bit that indicates if the transmission is DL or UL. Due to the difference in frame structure and different processing times between DL assignment reception→DL data reception and UL grant reception→UL data transmission, it is likely that DL and UL require different time-domain resource allocations. Therefore, the DL/UL indicator bit can be used as the first information for determining the time-domain resource allocation table.

In case of carrier aggregation, a wireless device is configured with multiple carriers. Different carriers might have different numerologies, and different need to coexist with long term evolution (LTE), and are set up with different DL/UL configurations. Then it makes sense to support different time-domain resource allocations for different carriers. Therefore, depending on the scheduled carrier, a time-domain resource allocation table is selected (i.e., the scheduled carrier may be used as first information for determining the time-domain resource allocation table). If no cross-carrier scheduling is applied (i.e., PDCCH is transmitted on same carrier as PDSCH or on associated carrier to PUSCH carrier) the carrier on which the scheduling DCI is transmitted determines the time-domain resource allocation table. If cross carrier scheduling is used (i.e., PDCCH is transmitted on another carrier as PDSCH or associated carrier to PUSCH carrier), information in the DCI or how the DCI is transmitted indicates the PDSCH/PUSCH carrier. For example, a Carrier Indicator Field (CIF) can be included in the DCI pointing to the PDSCH/PUSCH carrier. Different offsets with respect to how a search space is located in a CORESET might also be used to indicate the PDSCH/PUSCH carrier. Based on the identified carrier, a time-domain resource allocation table is selected.

In LTE and NR, transmissions can be scheduled using different Radio Network Temporary Identifiers (RNTI). As the name implies, RNTI is a kind of identification number, used to identify a specific radio channel and sometimes also a specific UE. Some examples are:
C-RNTI: used for scheduling at cell level. C-RNTI is a unique UE id used as an identifier of the RRC Connection and for scheduling.
RA-RNTI used during random access procedure.
SI-RNTI: identification of System Information in the downlink.
P-RNTI: identification of Paging and System Information change notification in the downlink.
For example, it could be envisioned that different RNTIs are used to schedule slot-based transmission and non-slot-based transmissions. Different RNTIs can therefore be mapped to different time-domain resource allocation and the wireless device—depending on which RNTI it detects—selects a time-domain resource allocation table. Thus, an RNTI may be used as first information for determining the time-domain resource allocation table.

NR supports different numerologies, e.g., OFDM subcarrier spacing and/or cyclic prefix. Different numerologies (including cyclic prefix) can be used to optimize transmissions with respect to latency or individually adopt the numerology to the current radio conditions of a terminal. Different numerologies can be mapped to different time-domain resource allocation and the wireless device, based on the numerology of a transmission, selects the correct time-domain resource allocation table. In NR, different bandwidth parts (BWP) will be used for different numerologies. Different BWP might thus use different time-domain resource allocation tables. For example, if the DCI contains a BWP indicator field this can be used as first information for determining the time-domain resource allocation table.

Yet another possibility is to use the slot format as first information for determining the time-domain resource allocation table. For example, the wireless device can determine which table to use based on a slot format determined by the wireless device. The slot format can be determined based on the slot in which PDSCH is received (or PUSCH is transmitted). Alternately the slot format can be determined based on the format applicable to the first slot from which the PDSCH is received (or PUSCH is transmitted) in case of multi-slot transmissions. The slot format can be determined by the wireless device via higher layer signaling and/or L1 signaling (e.g., slot format indicator received in DCI or group-common PDCCH) and indicates at least one more of downlink/uplink/unknown symbols within a slot.

In initial access, Remaining Minimum System Information (RMSI) can be transmitted based on slot-based transmissions and non-slot-based transmissions. The Master Information Block (MIB) on the Physical Broadcast Channel (PBCH) contain information about how RMSI is distributed. Depending on how RMSI is transmitted, different time-domain resource allocation tables can be used to maximize scheduling flexibility for RMSI. Thus, information related to how the RMSI is transmitted may be used as first information for determining the time domain resource allocation table.

Figure 2:
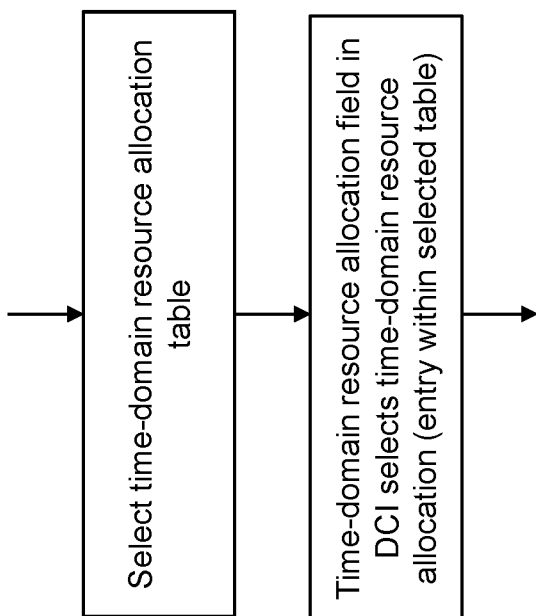
FIG. 2 illustrates an example of a method for use in a wireless device, in accordance with certain embodiments.

FIG. 2 shows a flow chart of a method in a wireless device for how to select a time-domain resource allocation table and a time-domain resource allocation entry within the table. First, the method comprises selecting a time-domain resource allocation table. In some embodiments, the method comprises selecting one of multiple time-domain resource allocation tables based on information available to the network node and the wireless device, for example, without the network node having to send DCI explicitly indicating which time-domain resource allocation table the wireless device should select. Second, the method comprises determining a time-domain resource allocation entry within the selected table. For example, from the network node perspective, the network node determines the time-domain resource allocation entry and explicitly signals the entry in the time-domain resource allocation field in DCI. From the wireless device perspective, the wireless device determines the time-domain resource allocation entry within the selected table based on the time-domain resource allocation field received in DCI from the network node.

In addition, it is possible that the tables discussed above are configured from a set of possible time-domain resource allocations. An example of a collection of time-domain resource allocations is given below in Table 1.

TABLE 1

| Possible time-domain resource allocations (captured in spec) | | | | |
|---|---|---|---|---|
| Time domain RA Index (I_TDRA) | PDSCH start offset from last OFDM symbol of PDCCH (X syms) | PDSCH length (L1 syms) | Applicable slots (L2 slots) | Comments |
| 0-13 | 0 | 1-14 | 1 | $1^{st}$ index corresponds to L1 = 1; $2^{nd}$ index to L1 = 2, . . . |
| 14-24 | 1 | 1-13 | 1 | $1^{st}$ index corresponds to L1 = 1; $2^{nd}$ index to L1 = 2, . . . |
| 25-36 | 2 | 1-12 | 1 | $1^{st}$ index corresponds to L1 = 1; $2^{nd}$ index to L1 = 2, . . . |
| 37-48 | 3 | 1-11 | 1 | $1^{st}$ index corresponds to L1 = 1; $2^{nd}$ index to L1 = 2, . . . |
| 49-59 | 4 | 1-10 | 1 | |
| 60-72 | −1 | 3-14 | 1 | $1^{st}$ index corresponds to L1 = 1; $2^{nd}$ index to L1 = 2, . . . |
| 73-84 | −2 | 4-14 | 1 | $1^{st}$ index corresponds to L1 = 1; $2^{nd}$ index to L1 = 2, . . . |
| 85-91 | 0 | 14 | 2-8 | $1^{st}$ index corresponds to L2 = 1; $2^{nd}$ index to L2 = 2, . . . |

TABLE 1-continued

Possible time-domain resource allocations (captured in spec)

| Time domain RA Index (I_TDRA) | PDSCH start offset from last OFDM symbol of PDCCH (X syms) | PDSCH length (L1 syms) | Applicable slots (L2 slots) | Comments |
| --- | --- | --- | --- | --- |
| 92-98 | 0 | 13 | 2-8 | $1^{st}$ index corresponds to L2 = 1; $2^{nd}$ index to L2 = 2, . . . |
| 99-105 | 0 | 12 | 2-8 | $1^{st}$ index corresponds to L2 = 1; $2^{nd}$ index to L2 = 2, . . . |
| 106-112 | 0 | 11 | 2-8 | $1^{st}$ index corresponds to L2 = 1; $2^{nd}$ index to L2 = 2, . . . |
| 113-119 | 1 | 13 | 2-8 | $1^{st}$ index corresponds to L2 = 1; $2^{nd}$ index to L2 = 2, . . . |
| 120-126 | 1 | 12 | 2-8 | $1^{st}$ index corresponds to L2 = 1; $2^{nd}$ index to L2 = 2, . . . |
| 127-133 | 1 | 11 | 2-8 | $1^{st}$ index corresponds to L2 = 1; $2^{nd}$ index to L2 = 2, . . . |
| 134-140 | 2 | 12 | 2-8 | $1^{st}$ index corresponds to L2 = 1; $2^{nd}$ index to L2 = 2, . . . |
| 141-147 | 2 | 11 | 2-8 | ""$1^{st}$ index corresponds to L2 = 1; $2^{nd}$ index to L2 = 2, . . . |
| 148-155 | 3 | 11 | 2-8 | $1^{st}$ index corresponds to L2 = 1; $2^{nd}$ index to L2 = 2, . . . |
| 156-163 | All DL symbols determined from the SFI of the slot in which PDSCH is received | | 1-8 | $1^{st}$ index corresponds to L2 = 1; $2^{nd}$ index to L2 = 2, . . . |
| 164 | All DL symbols determined from the SFI of the slot in which PDSCH is received; starting from the last OFDM symbol in which PDCCH is received | | 1 | |
| other values reserved (e.g., up to 255) | | | | |

In Table 1, the multi-slot scheduling has been directly included as a separate column in the table. It is found under the column "Applicable slots (L2 slots)." In other embodiments, the multi-slot scheduling may be indicated by other means. In some embodiments, four entries of Table 1 could be configured to build Table A of FIG. 1 (e.g., Table A has four entries in the example shown in FIG. 1). The signaling for this can be in system information or by wireless device-specific signaling by radio resource control (RRC). Similar methods can also be done for Table B and so on.

A table would then be selected according first information, such as an RNTI, information contained in the DCI, which DCI format has been used for scheduling, which CORESET/search space has been used for scheduling, if the transmission is slot-based or non-slot-based, carrier aggregation related information, bandwidth part related information, slot format, and/or information indicating numerology (e.g., a cyclic prefix, an OFDM subcarrier spacing, etc.). The time-domain resource allocation field in the DCI will point out an entry in the selected table. It is further observed that although Table 1 is described for PDSCH, a similar table can be constructed for PUSCH. As said earlier, different tables (Table A, Table B, . . . ) can be configured for different CORESET/search spaces/ . . . , and each Table A, B, . . . is configured with rows from Table 1.

Specific for initial access, some entries for Table 1 can be directly hardcoded in the specification for scheduling of example system information, paging, random access response, Message 3 in the random access procedure. If there would be no default values, additional signaling would be needed in MIB/PBCH to configure the default time-domain resource allocation(s). These values can also be default values the wireless device uses unless configured with a new time-domain resource allocation table.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 3:
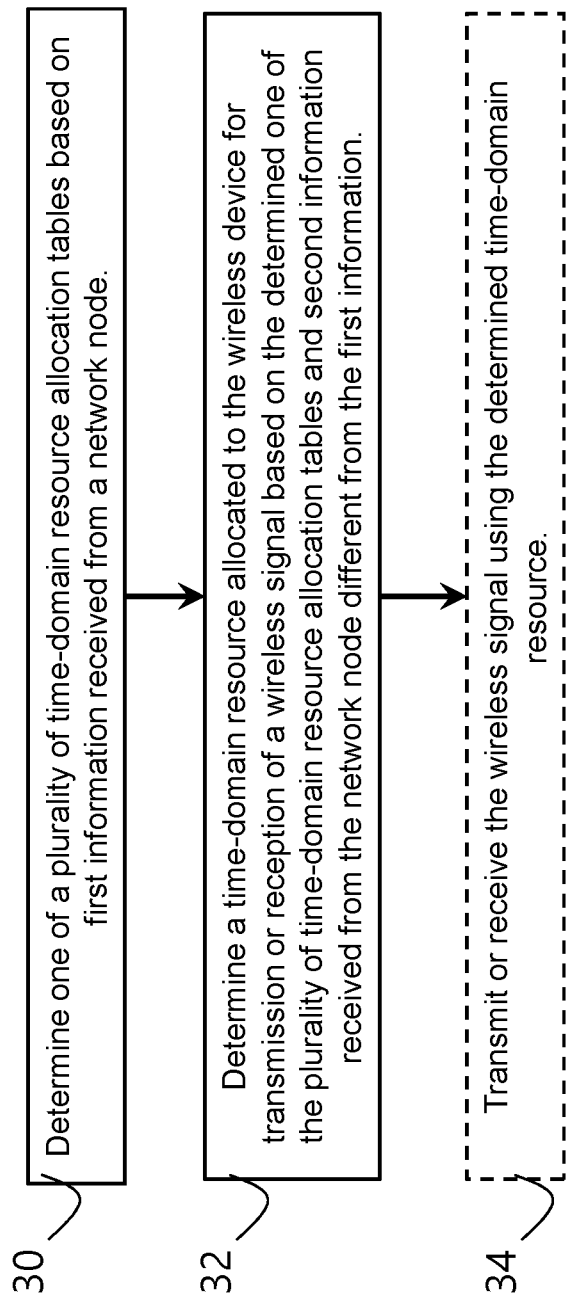
FIG. 3 illustrates an example of a method for use in a wireless device, in accordance with certain embodiments.

FIG. 3 depicts a method in accordance with particular embodiments. In certain embodiments, the method may be performed by a wireless device, such as a UE. The method begins at step 30 with determining one of a plurality of time-domain resource allocation tables based on first information received from a network node. The method continues to step 32 with determining a time-domain resource allocated to the wireless device for transmission or reception of a wireless signal based on the determined one of the plurality of time-domain resource allocation tables and second information received from the network node different from the first information. Examples of first information, i.e., information from which the wireless device may determine the time-domain resource allocation table and second information, i.e., information from which the wireless device may determine the time-domain resource include, but are not limited to, the examples described with respect to FIGS. 1-2 and above and the Group A embodiments below. In some embodiments, the method further comprises transmitting or receiving the wireless signal at step 34 using the determined time-domain resource.

Figure 4:
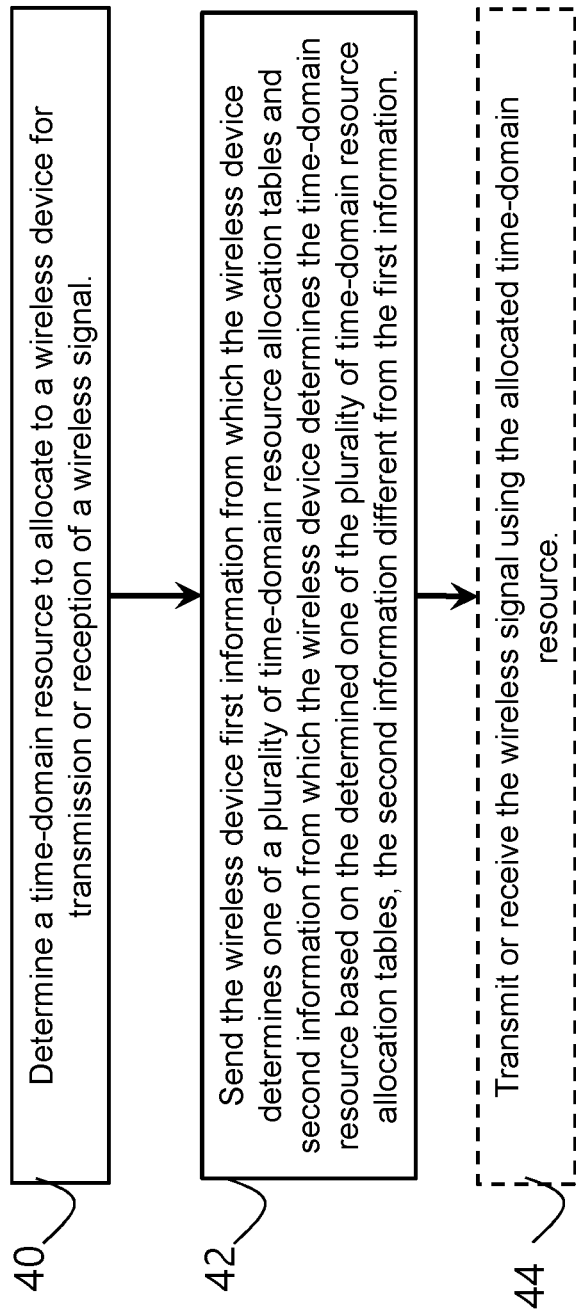
FIG. 4 illustrates an example of a method for use in a network node, in accordance with certain embodiments.

FIG. 4 depicts a method in accordance with particular embodiments. In certain embodiments, the method may be performed by a network node, such as a base station. The method begins at step 40 with determining a time-domain resource to allocate to a wireless device for transmission or reception of a wireless signal. For example, in some embodiments, the network node determines the time-domain resource allocation based on an identified table and other information, such as current scheduling needs. The network node may then select the entry from the table that corresponds to the determined time-domain resource allocation.

Additionally, the network node may determine second information for indicating the selected entry to the wireless device. The method proceeds to step 42 with sending the wireless device first information from which the wireless device determines one of a plurality of time-domain resource allocation tables and second information from which the wireless device determines the time-domain resource based on the determined one of the plurality of time-domain resource allocation tables. The second information is different from the first information. Examples of first information, i.e., information sent to the wireless device from which the wireless device may determine the time-domain resource allocation table and second information, i.e., information sent to the wireless device from which the wireless device may determine the time-domain resource include, but are not limited to, the examples described with respect to FIGS. 1-2 and above and the Group B embodiments below. In some embodiments, the method further comprises transmitting or receiving the wireless signal at step 44 using the allocated time-domain resource.

With respect to the examples in FIGS. 3 and 4, in certain embodiments, the first information comprises one or more of:

a. information contained in downlink control information (DCI) from the network and signalled to the wireless device for another purpose besides determining the time-domain resource;

b. information indicating which DCI format has been used for scheduling (e.g., regular DCI format or fallback DCI format);

c. information indicating which CORESET/search space has been used for scheduling;

d. information indicating if the transmission is slot-based or non-slot-based;

e. carrier aggregation related information;

f. bandwidth part related information;

g. information indicating a slot format;

h. information indicating if the transmission is single slot or multi-slot;

i. configuration of downlink/uplink indicator received in DCI;

j. Radio Network Temporary Identifiers (RNTI); and/or k. information indicating numerology (e.g., OFDM sub-carrier spacing and/or cyclic prefix).

The second information comprises a time-domain resource allocation field within downlink control information that allows the wireless device/UE to determine which entry to use within the determined one of the plurality of tables in order to determine the allocated time-domain resource.

Figure 5:
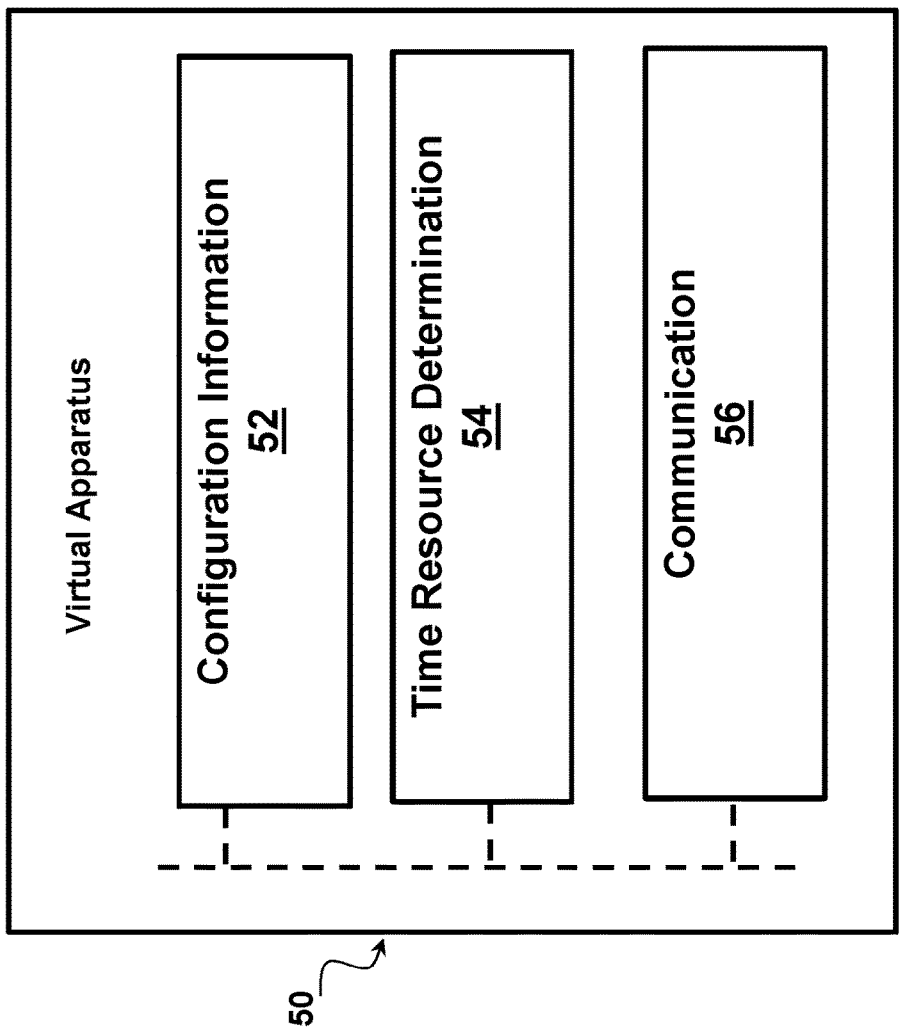
FIG. 5 illustrates a schematic block diagram of an apparatus in a wireless network, in accordance with certain embodiments.
Figure 6:
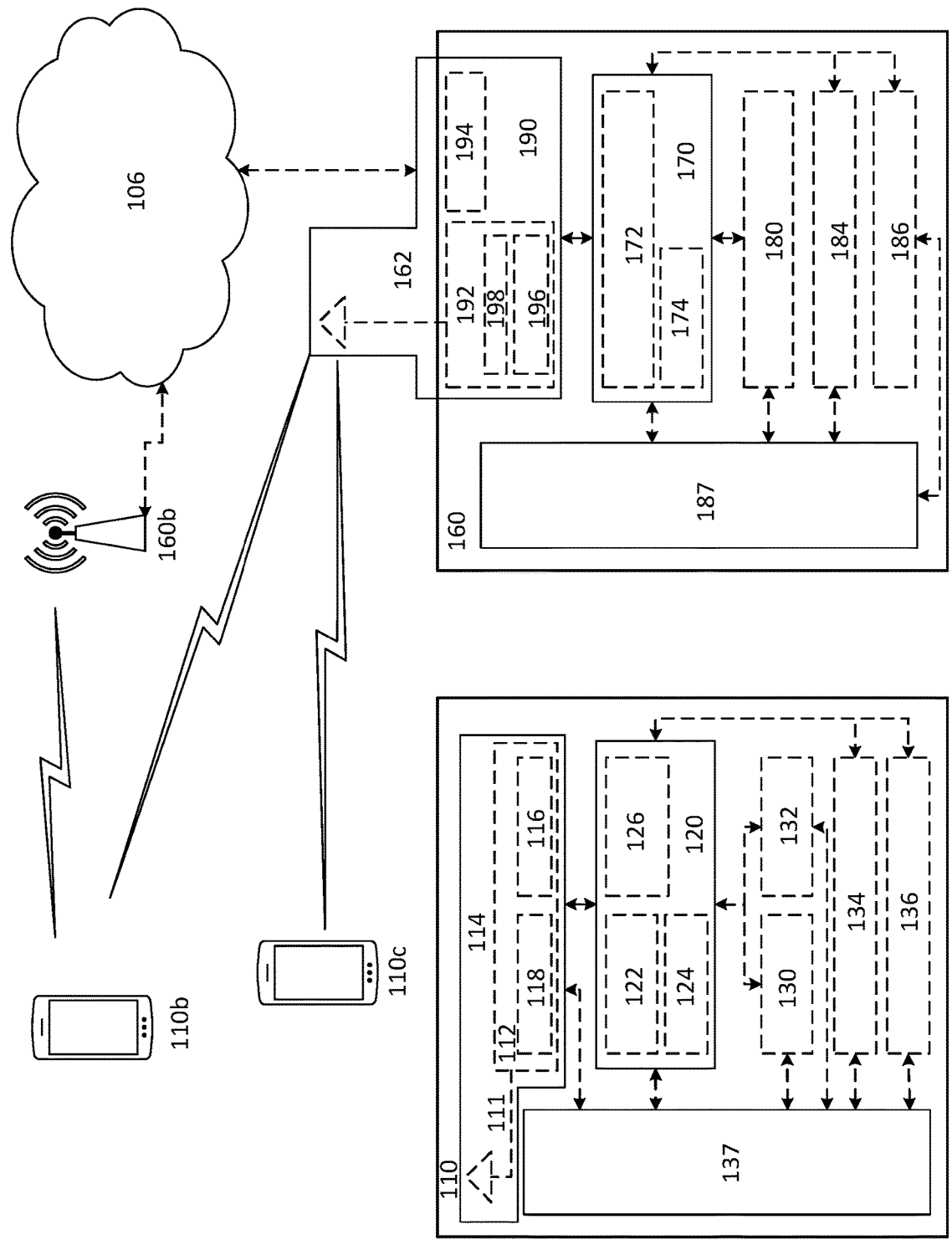
FIG. 6 illustrates an example of a wireless network, in accordance with some embodiments.

FIG. 5 illustrates a schematic block diagram of an apparatus 50 in a wireless network (for example, the wireless network shown in FIG. 6). The apparatus may be implemented in a wireless device or network node (e.g., wireless device 110 or network node 160 shown in FIG. 6). Apparatus 50 is operable to carry out the example method described with reference to FIG. 3 or FIG. 4 and possibly any other processes or methods disclosed herein. It is also to be understood that the method of FIGS. 3 and 4 are not necessarily carried out solely by apparatus 50. At least some operations of the method can be performed by one or more other entities.

Virtual Apparatus 50 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause configuration information unit 52, time resource determination unit 54, communication unit 56, and any other suitable units of apparatus 50 to perform corresponding functions according one or more embodiments of the present disclosure.

As illustrated in FIG. 5, apparatus 50 includes configuration information unit 52, time resource determination unit 54, and communication unit 56. In certain embodiments, configuration information unit 52 is configured to determine first information and second information. For example, when used in a network node, configuration information unit 52 determines first information to send to a wireless device from which the wireless device determines one of a plurality of tables, and second information from which the wireless determines (based on the one of the plurality of tables determined from the first information) an allocated time-domain resource. When used in a wireless device, configuration information unit 52 determines the first and second information received from the network node. Time resource determination unit 54 determines a time resource allocated to the wireless device for transmission or reception of a wireless signal. When used in a network node, time resource determination unit 54 may allocate a time-domain resource and may indicate the allocated time-domain resource to the network node's configuration information unit 52 so that the configuration information unit 52 can determine the first and second information to send the wireless device (e.g., first and second information that corresponds to the allocated time-domain resource). When used in a wireless device, time resource determination unit 54 can receive the first and second information from the network node (e.g., via the wireless device's configuration information module 52) and can use the first and second information to determine the time-domain resource that the network node has allocated for the transmission or reception of a wireless signal. Communication unit 56 transmits or receives the wireless signal according to the allocated time domain resource that was determined by the time resource determination unit 54.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method performed by a wireless device, the method comprising:
    determining one of a plurality of tables based on first information received from a network node (e.g., base station),
    determining a time-domain resource allocated to the wireless device for transmission or reception of a wireless signal based on the determined one of the plurality of tables and second information received from the network node different from or other than the first information.
2. The method of the previous embodiment, wherein the plurality of tables are time-domain resource allocation tables.
3. The method of any of the previous embodiments, further comprising transmitting or receiving the wireless signal using the determined time-domain resource.
4. The method of any of the previous embodiments, wherein the second information is a time-domain resource allocation field received in downlink control information.
5. The method of any of the previous embodiments, wherein the first information comprises one or more of:
    a. information contained in downlink control information (DCI) from the network and signalled to the wireless device for another purpose besides determining the time-domain resource;
    b. information indicating which DCI format has been used for scheduling (e.g., regular DCI format or fallback DCI format);
    c. information indicating which CORESET/search space has been used for scheduling;
    d. information indicating if the transmission is slot-based or non-slot-based;
    e. carrier aggregation related information;
    f. bandwidth part related information;
    g. information indicating a slot format;
    h. information indicating if the transmission is single slot or multi-slot;
    i. configuration of downlink/uplink indicator received in DCI;
    j. Radio Network Temporary Identifiers (RNTI); and/or
    k. information indicating numerology (e.g., OFDM subcarrier spacing and/or cyclic prefix).
6. A method performed by a wireless device, the method comprising:
    using a selected one of a plurality of tables to determine a time-domain resource that a network has allocated to the wireless device for transmission or reception of a wireless signal.
7. The method of the previous embodiment, further comprising determining the selected table based on information other than a time-domain resource allocation field received in downlink control information from the network.
8. The method of any of the previous embodiments, further comprising making the selection of the selected table at the wireless device based on information that is available to both the network and the wireless device.
9. The method of example embodiment 6, wherein the information used to make the selection of the selected table comprises one or more of:
    information contained in downlink control information (DCI) from the network and signalled to the wireless device for another purpose besides identifying the selected time-domain resource allocation;
    which DCI format has been used for scheduling (e.g., regular DCI format or fallback DCI format);

which CORESET/search space has been used for scheduling;

if the transmission is slot-based or non-slot-based;

carrier aggregation related information;

bandwidth part related information;

slot format;

if the transmission is single slot or multi-slot;

configuration of downlink/uplink indicator received in DCI;

Radio Network Temporary Identifiers (RNTI); and/or numerology (e.g., OFDM subcarrier spacing and/or cyclic prefix).

10. The method of any of the previous embodiments, wherein when the time-domain resource allocation is used in scheduling system information, the selected table is based on whether the system information is distributed according to slot-based or non-slot based transmission.

11. The method of any of the previous embodiments, further comprising determining a selected one of a plurality of entries within the selected table, the selected entry indicating the time-domain resource that the network has allocated to the wireless device for the transmission or reception of the wireless signal.

12. The method of the previous embodiment, wherein the selected entry is determined based on an explicit indication received from the network.

13. The method of the previous embodiment, wherein the explicit indication is received via a time-domain resource allocation bit field received in downlink control information from the network.

14. The method of any of the previous embodiments, wherein the selected entry indicates at least two of a start symbol, a stop symbol, and a duration in symbols for the transmission or reception of the wireless signal.

15. The method of any of the previous embodiments, further comprising transmitting the wireless signal on a physical uplink shared channel (PUSCH) using the allocated time-domain resource.

16. The method of any of the previous embodiments, further comprising receiving the wireless signal on a physical downlink shared channel (PDSCH) using the allocated time-domain resource.

17. The method of any of the previous embodiments, wherein:

a first of the plurality of tables expresses a start or end OFDM symbol as an absolute OFDM symbol number relative to a slot boundary, and a second of the plurality of tables expresses the start or end OFDM symbol relative to PDCCH/CORESET symbol(s) used to schedule PDSCH/PUSCH.

18. The method of any of the previous embodiments, wherein a first of the plurality of tables comprises a different number of entries than a second of the plurality of tables.

19. The method of any of the previous embodiments, wherein each of the plurality of tables comprises the same number of entries.

20. The method of any of the previous embodiments, further comprising:

providing user data; and forwarding the user data to a host computer via the transmission to the network node.

Group B Embodiments

21. A method performed by a base station, the method comprising:

determining a time-domain resource to allocate to a wireless device for transmission or reception of a wireless signal, and sending the wireless device first information from which the wireless device determines one of a plurality of tables and second information from which the wireless determines, based on the one of the plurality of tables, the allocated time-domain resource, the second information different from or other than the first information.

22. The method of the previous embodiment, wherein the plurality of tables are time-domain resource allocation tables.

23. The method of any of the previous embodiments, further comprising transmitting or receiving the wireless signal using the determined time-domain resource.

24. The method of any of the previous embodiments, wherein the second information is a time-domain resource allocation field sent in downlink control information.

25. The method of any of the previous embodiments, wherein the first information comprises one or more of:

a. information contained in downlink control information (DCI) signaled from the base station to the wireless device for another purpose besides determining the time-domain resource;

b. information indicating which DCI format has been used for scheduling (e.g., regular DCI format or fallback DCI format);

c. information indicating which CORESET/search space has been used for scheduling;

d. information indicating if the transmission is slot-based or non-slot-based;

e. carrier aggregation related information;

f. bandwidth part related information;

g. information indicating a slot format;

h. information indicating if the transmission is single slot or multi-slot;

i. configuration of downlink/uplink indicator received in DCI;

j. Radio Network Temporary Identifiers (RNTI); and/or k. information indicating numerology (e.g., OFDM subcarrier spacing and/or cyclic prefix).

26. A method performed by a network node (e.g., base station), the method comprising:

determining one of a plurality of tables that a wireless device is using to determine which time-domain resource the network node is allocating to the wireless device for transmission or reception of a wireless signal;

sending the wireless device information indicating one of a plurality of entries within the determined one of the plurality of tables, the selected entry indicating a time-domain resource that has been allocated to the wireless device for the transmission or reception of the wireless signal.

27. The method of any of the previous embodiments, wherein the one of the plurality of tables is determined based on information that is available to both the network node and the wireless device.

28. The method of example embodiment 26, wherein the information used to determine which table the wireless device is using (i.e., the one of the plurality of tables) comprises:

information contained in downlink control information (DCI) that the network signals to the wireless device for another purpose besides identifying the selected time-domain resource allocation;

which DCI format has been used for scheduling (e.g., regular DCI format or fallback DCI format);

which CORESET/search space has been used for scheduling;

if the transmission is slot-based or non-slot-based;

carrier aggregation related information;

bandwidth part related information;

slot format;

if the transmission is single slot or multi-slot;

configuration of downlink/uplink indicator received in DCI;

Radio Network Temporary Identifiers (RNTI); and/or numerology (e.g., OFDM subcarrier spacing and/or cyclic prefix).

29. The method of any of the previous embodiments, wherein when the time-domain resource allocation is used in scheduling system information, the one of the plurality of tables is determined based on whether the system information is distributed according to slot-based or non-slot based transmission.

30. The method of the previous embodiment, wherein the information indicating the one of the plurality of entries is sent explicitly.

31. The method of the previous embodiment, wherein the information indicating the one of the plurality of entries is sent via a time-domain resource allocation bit field in downlink control information sent to the wireless device.

32. The method of any of the previous embodiments, wherein the one of the plurality of entries indicates at least two of a start symbol, a stop symbol, and a duration in symbols for the transmission or reception of the wireless signal.

33. The method of any of the previous embodiments, further comprising receiving the wireless signal on a physical uplink shared channel (PUSCH) using the allocated time-domain resource.

34. The method of any of the previous embodiments, further comprising transmitting the wireless signal on a physical downlink shared channel (PDSCH) using the allocated time-domain resource.

35. The method of any of the previous embodiments, wherein:
a first of the plurality of tables expresses a start or end OFDM symbol as an absolute OFDM symbol number relative to a slot boundary, and
a second of the plurality of tables expresses the start or end OFDM symbol relative to PDCCH/CORESET symbol(s) used to schedule PDSCH/PUSCH.

36. The method of any of the previous embodiments, wherein a first of the plurality of tables comprises a different number of entries than a second of the plurality of tables.

37. The method of any of the previous embodiments, wherein each of the plurality of tables comprises the same number of entries.

38. The method of any of the previous embodiments, further comprising:
obtaining user data; and
forwarding the user data to a host computer or a wireless device.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 7:
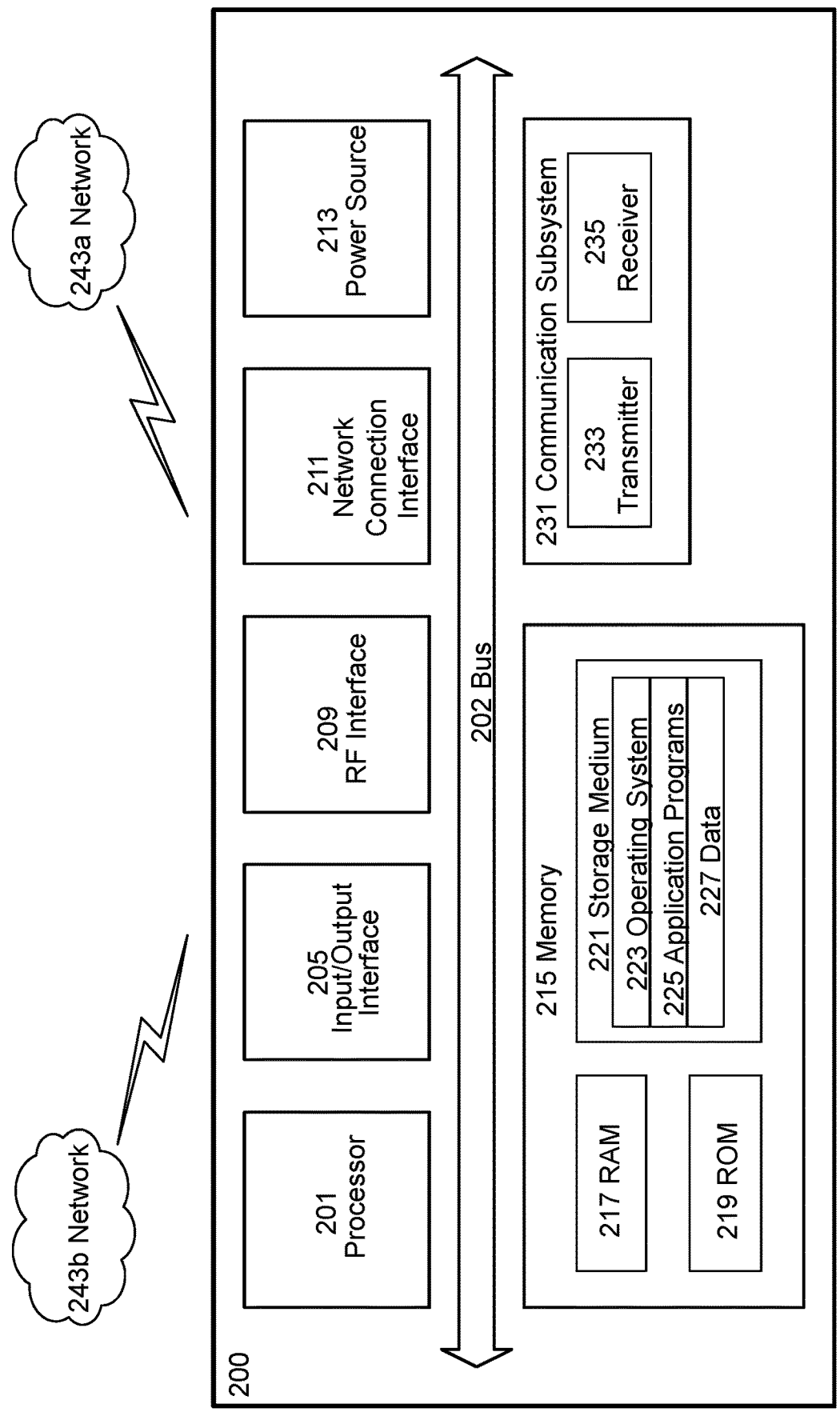
FIG. 7 illustrates an example of a User Equipment, in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

APPENDIX A

Hereinafter, further example embodiments related to NR resource allocation design issues are discussed, and more specifically time domain resource allocation.

Time Allocation

In 3GPP RAN1#90bis meeting the following was agreed:

Agreements:
 For both slot and mini-slot, the scheduling DCI can
  provide an index into a UE-specific table giving the OFDM symbols used for the PDSCH (or PUSCH) transmission
  starting OFDM symbol and length in OFDM symbols of the allocation
  For Further Study (FFS): one or more tables
  FFS: including the slots used in case of multi-slot/multi-mini-slot scheduling or slot index for cross-slot scheduling
  FFS: May need to revisit if SFI support non-contiguous allocations
 At least for RMSI scheduling
  At least one table entry needs to be fixed in the spec Regarding whether one or more tables should be specified, it is believed that multiple tables can provide more flexibility in scheduling. However, in order to limit the DCI message size to select the tables, the number of tables may be limited to two. The table entries in the two tables can differ in starting OFDM symbol and/or duration. The selection of tables can be based on other fields in DCI message such as whether Type A or Type B scheduling is used, or a field that signals whether slot-based or mini-slot based transmission is scheduled.

Proposal 3-1: To provide more flexibility in time domain resource allocation, two tables are specified with different starting OFDM symbol and duration in OFDM symbols.

For NR, data transmission may occupy (almost) all OFDM symbols in a slot or, in case of a mini-slot transmission, only some of them. These possibilities can be handled in a unified way by including information in the DCI about the PUSCH and PDSCH the starting and ending position. To limit the DCI overhead while at the same time provide some flexibility one possibility is to have, e.g., 3 bits in the DCI pointing into different combinations of starting and ending positions.

The combinations should also be aligned with OFDM symbol positions given by SFI (slot format indicator) in group common PDCCH (e.g., the combinations shown in [1]). For DL, the reference for starting and ending positions should be with respect to the first OFDM symbol of the PDCCH carrying the corresponding DCI. Some starting positions may be –ve values to accommodate the cases where PDSCH starts before the symbol in which PDCCH coreset is configured. To limit UE buffering requirements, only limited –ve values should be allowed (e.g., only –2, –1).

Data may also span multiple slots in case of slot aggregation/repetition. To handle slot aggregation, the UE assumes the same time resource allocation in slots wherein the transmission is repeated.

Proposal 3-2: When slot aggregation/repetition is applied, the UE assumes the same time resource allocation in slots wherein the transmission is repeated.

To have more efficiency in DCI message it would be possible to make the bit fields in the DCI message depending on which CORESET the DCI is transmitted from. This is to allow more appropriate options of configurations of the starting and stop OFDM symbols for PDSCH and PUSCH.

Proposal 3-3: The bitfield in the DCI message indicating the starting and ending OFDM symbol within a slot is configured separately per CORESET.

Furthermore, for UL and DL in some cases there would be a need to define in which slot the transmission of PUSCH or PDSCH should occur in. Such information could either be a separate bitfield or be jointly encoded with the starting and ending position. It is noted here however that to be able to support rather long periods of UL slot there would be a need for around 4 bits to support these cases. A similar need does not strictly exist for DL as in DL a DCI message can be provided in each DL slot so for DL the information could be joint coded with the location information within the slot or a single bit could be introduced to indicate scheduling in the next preceding slot.

Proposal 3-4
 For PUSCH transmissions, an bitfield of up to 4 bits is introduced in the DCI message to indicate which UL slot the PUSCH is transmitted within
 For PDSCH, indication of which DL slot the PDSCH is transmitted is either joint coded with the location information within the slot or a single bit could be introduced to indicate scheduling in the next preceding slot.

APPENDIX B

Figure 8:
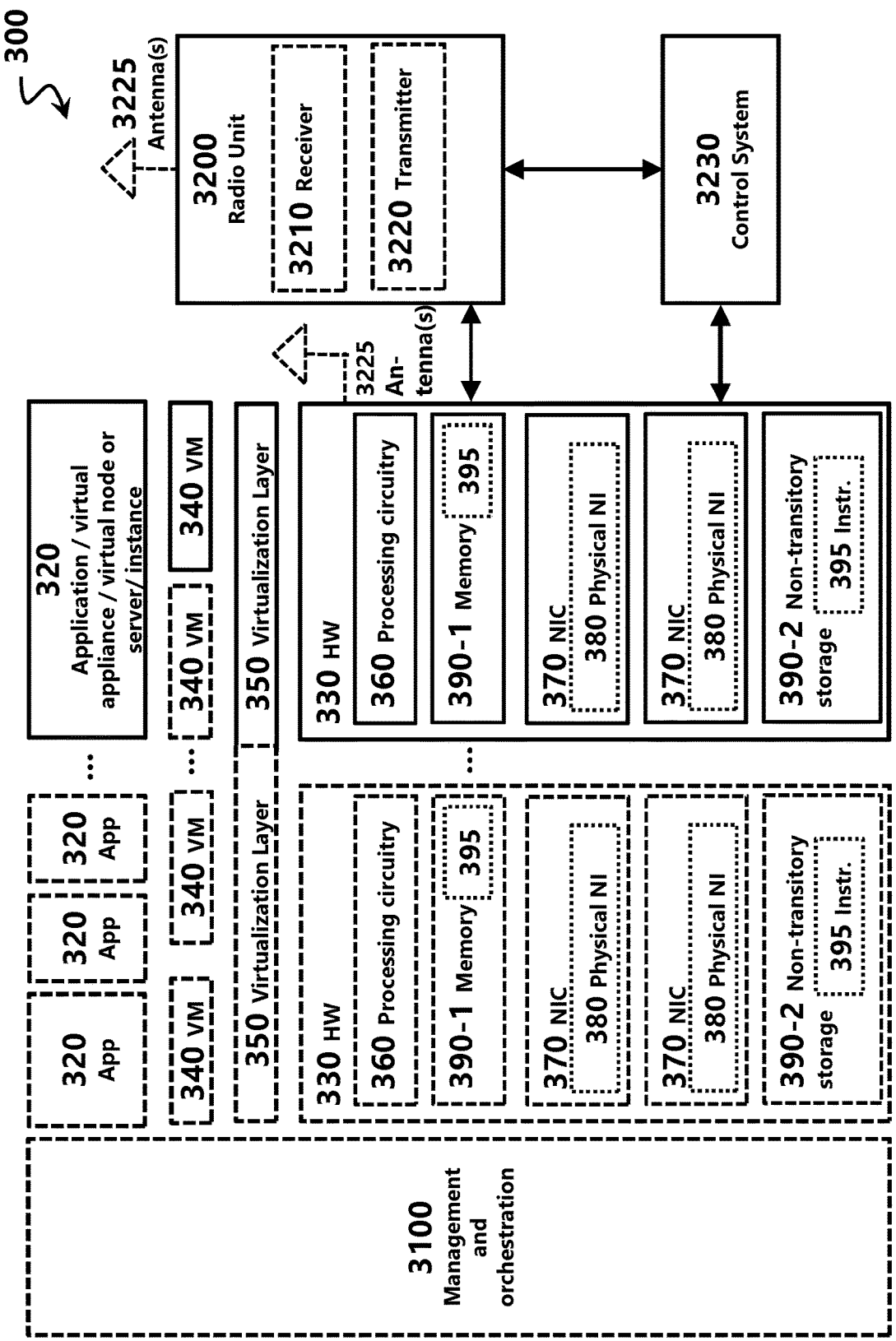
FIG. 8 illustrates an example of a virtualization environment, in accordance with some embodiments.

Some additional embodiments contemplated herein will now be described more fully with reference to FIGS. 8-14. FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 9:
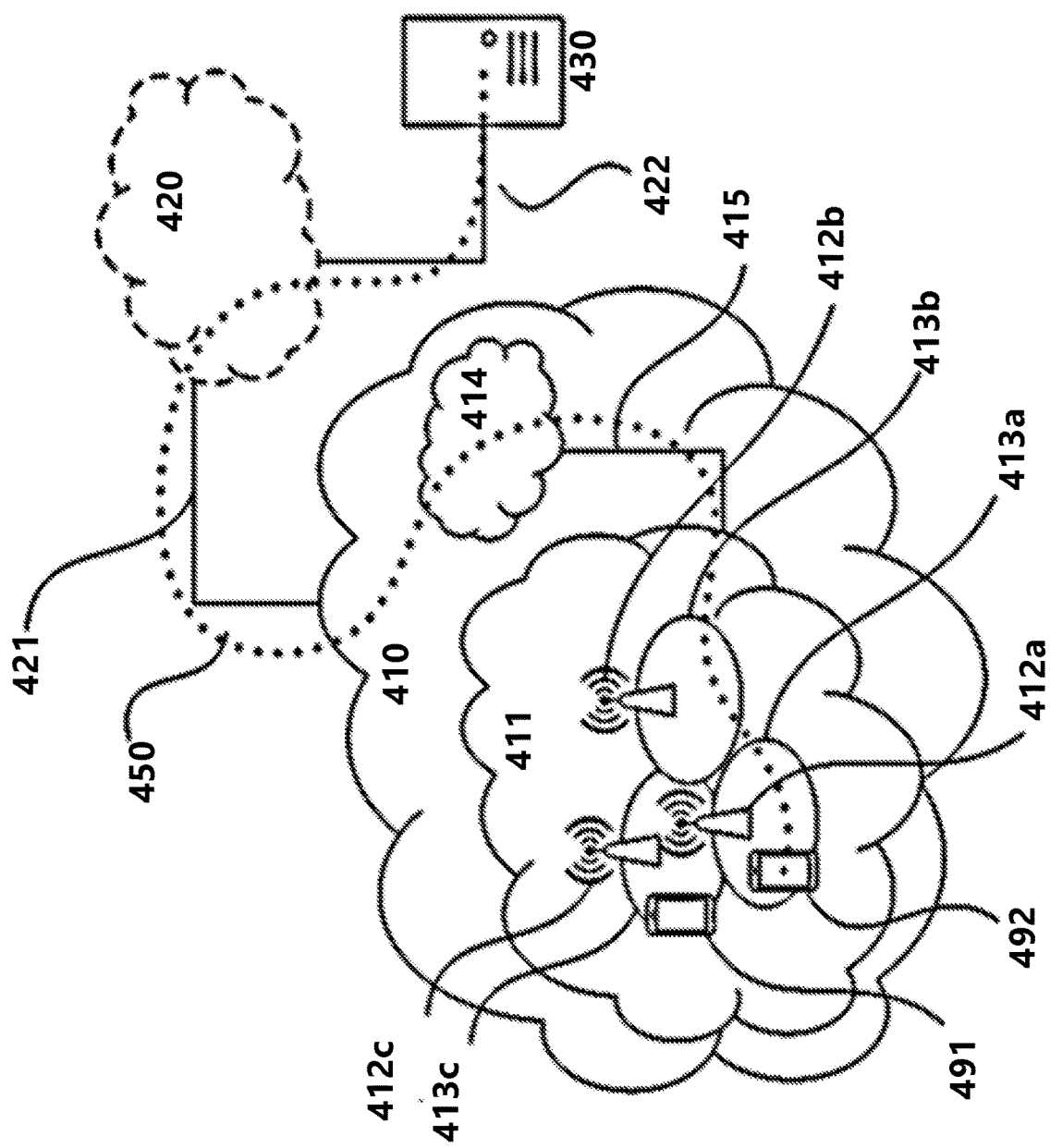
FIG. 9 illustrates an example of a telecommunication network connected via an intermediate network to a host computer, in accordance with some embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 10:
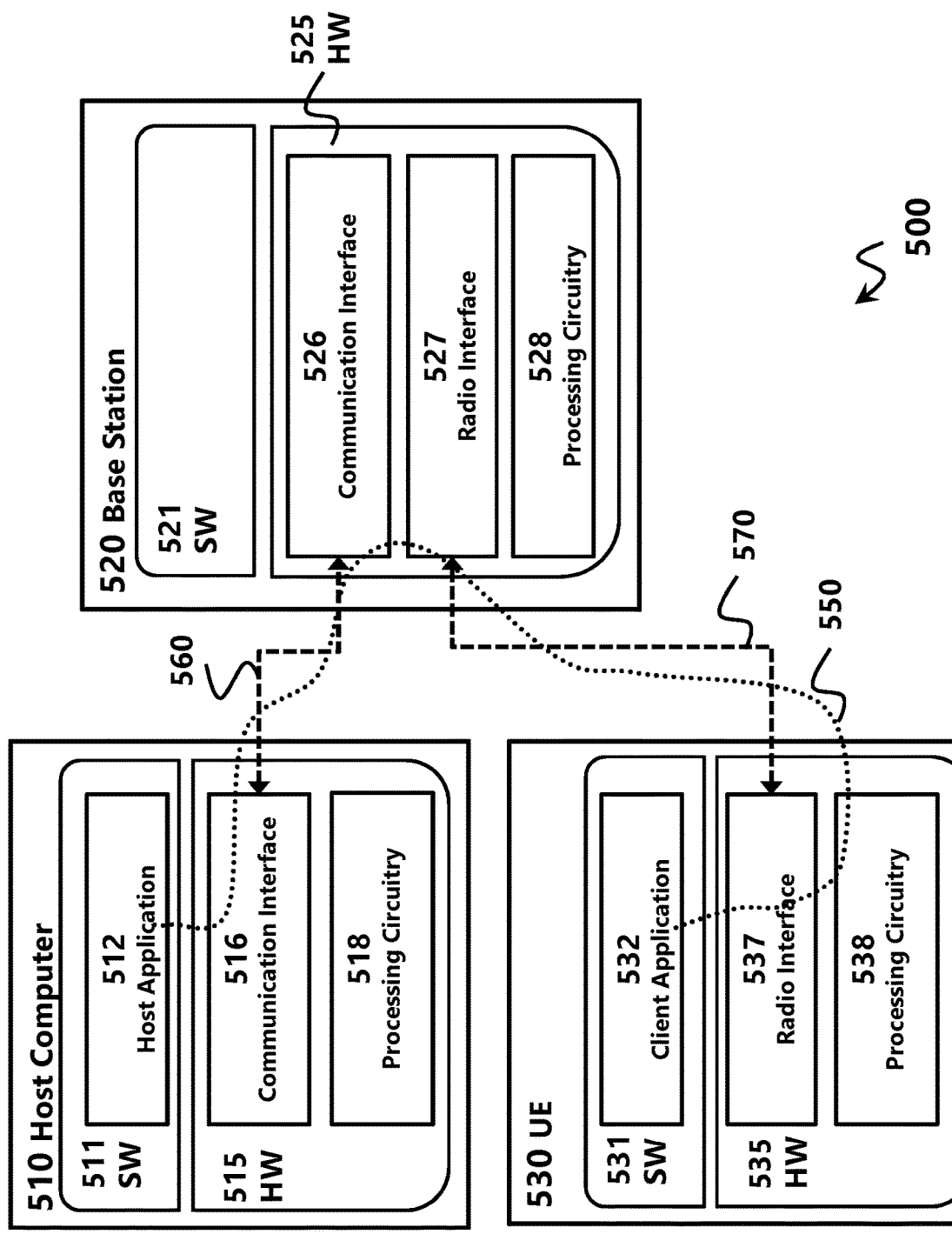
FIG. 10 illustrates an example of a host computer communicating via a base station with a user equipment over a partially wireless connection, in accordance with some embodiments.

It is noted that host computer 510, base station 520 and UE 530 illustrated in FIG. 10 may be similar or identical to host computer 430, one of base stations 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate and latency, for example, by allowing for more flexible scheduling of time-domain resources, and thereby provide benefits such as reduced user waiting time.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
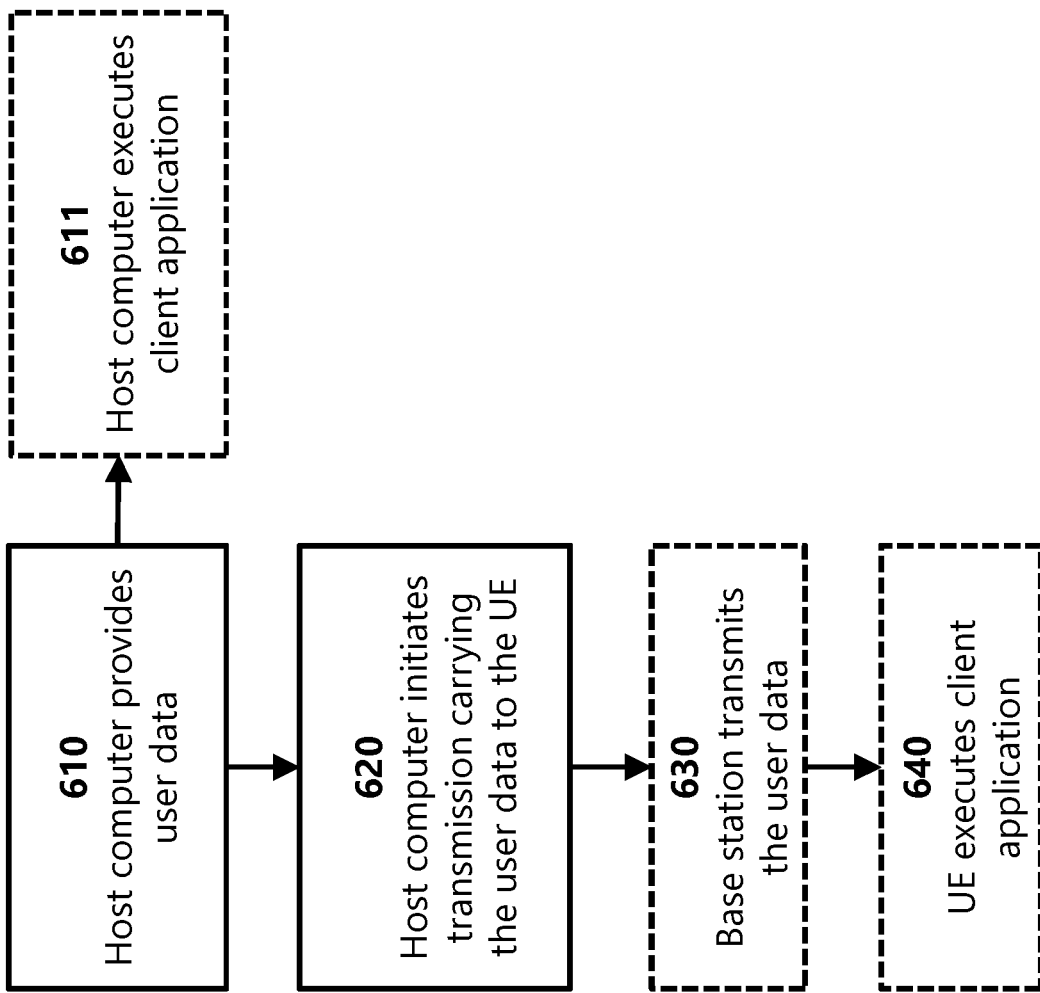
FIG. 11 illustrates an example of methods implemented in a communication system including a host computer, a base station and a user equipment, in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
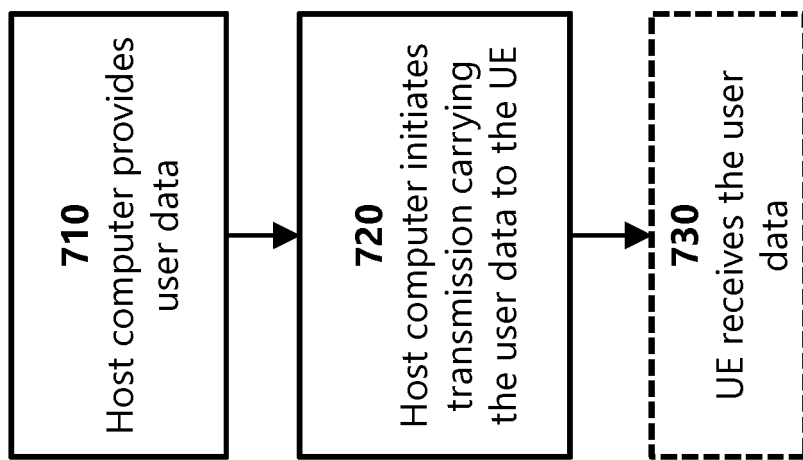
FIG. 12 illustrates an example of methods implemented in a communication system including a host computer, a base station and a user equipment, in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
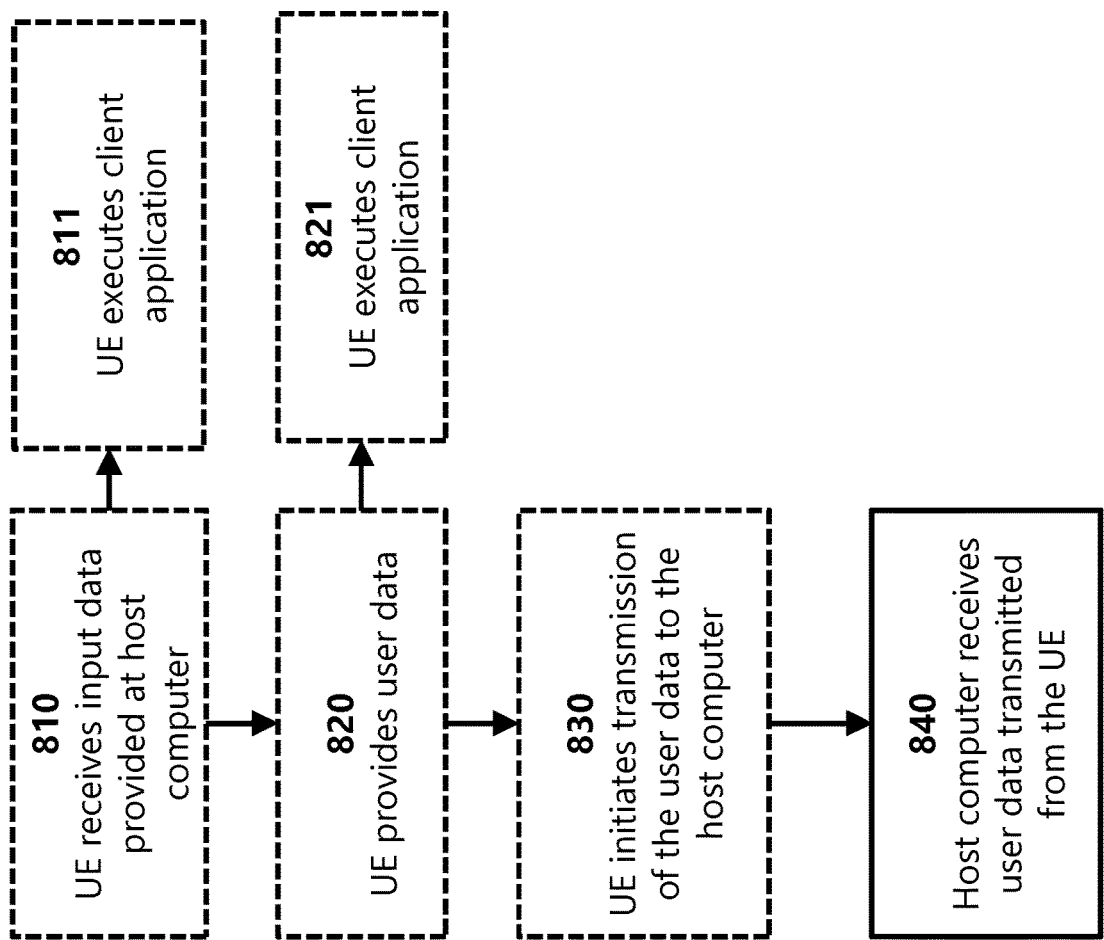
FIG. 13 illustrates an example of methods implemented in a communication system including a host computer, a base station and a user equipment, in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
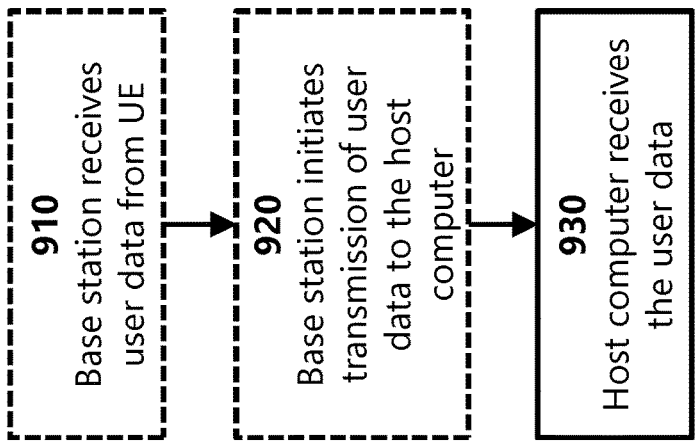
FIG. 14 illustrates an example of methods implemented in a communication system including a host computer, a base station and a user equipment, in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Group C Embodiments

39. A wireless device, configured to perform any of the steps of any of the Group A embodiments.
40. A network node (e.g., base station), configured to perform any of the steps of any of the Group B embodiments.
41. A wireless device, the wireless device comprising:
   processing circuitry configured to perform any of the steps of any of the Group A embodiments; and
   power supply circuitry configured to supply power to the wireless device.
42. A base station, the base station comprising:
   processing circuitry configured to perform any of the steps of any of the Group B embodiments;
   power supply circuitry configured to supply power to the wireless device.
43. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
44. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.
45. The communication system of the pervious embodiment further including the base station.
46. The communication system of the previous 2 embodiments, further including the UE, wherein the UE is configured to communicate with the base station.
47. The communication system of the previous 3 embodiments, wherein:
   the processing circuitry of the host computer is configured to execute a host application, thereby providing the user data; and the UE comprises processing circuitry configured to execute a client application associated with the host application.

48. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B embodiments.

49. The method of the previous embodiment, further comprising, at the base station, transmitting the user data.

50. The method of the previous 2 embodiments, wherein the user data is provided at the host computer by executing a host application, the method further comprising, at the UE, executing a client application associated with the host application.

51. A user equipment (UE) configured to communicate with a base station, the UE comprising a radio interface and processing circuitry configured to perform any of the of the methods of the previous 3 embodiments.

52. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.

53. The communication system of the previous embodiment, wherein the cellular network further includes a base station configured to communicate with the UE.

54. The communication system of the previous 2 embodiments, wherein:
    the processing circuitry of the host computer is configured to execute a host application, thereby providing the user data; and
    the UE's processing circuitry is configured to execute a client application associated with the host application.

55. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.

56. The method of the previous embodiment, further comprising at the UE, receiving the user data from the base station.

57. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.

58. The communication system of the previous embodiment, further including the UE.

59. The communication system of the previous 2 embodiments, further including the base station, wherein the base station comprises a radio interface configured to communicate with the UE and a communication interface configured to forward to the host computer the user data carried by a transmission from the UE to the base station.

60. The communication system of the previous 3 embodiments, wherein:
    the processing circuitry of the host computer is configured to execute a host application; and
    the UE's processing circuitry is configured to execute a client application associated with the host application, thereby providing the user data.

61. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.

62. A method implemented in a communication system including a host computer, a base station and a user equipment (UE), the method comprising:
    at the host computer, receiving user data transmitted to the base station from the UE, wherein the UE performs any of the steps of any of the Group A embodiments.

63. The method of the previous embodiment, further comprising, at the UE, providing the user data to the base station.

64. The method of the previous 2 embodiments, further comprising:
    at the UE, executing a client application, thereby providing the user data to be transmitted; and
    at the host computer, executing a host application associated with the client application.

65. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

66. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

67. The communication system of the previous embodiment further including the base station.

68. The communication system of the previous 2 embodiments, further including the UE, wherein the UE is configured to communicate with the base station.

69. The communication system of the previous 3 embodiments, wherein:
    the processing circuitry of the host computer is configured to execute a host application;

the UE is configured to execute a client application associated with the host application, thereby providing the user data to be received by the host computer.

70. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

71. The method of the previous embodiment, further comprising at the base station, receiving the user data from the UE.

72. The method of the previous 2 embodiments, further comprising at the base station, initiating a transmission of the received user data to the host computer.

The invention claimed is:

1. A method implemented by a host computer configured to operate in a communication system including a base station and a user equipment (UE), the method comprising:
at the host computer, providing user data associated with the UE; and
at the host computer, initiating a transmission carrying the user data to the UE via a cellular network comprising the base station, wherein the base station:
obtains first information available to both the UE and the base station,
transmits a time-domain resource allocation field in a downlink control information, DCI, to the UE, the time domain resource allocation field indicating a time-domain resource allocation entry within a time-domain resource allocation table, the time domain resource allocation table being defined by a plurality of entries each specifying a different combination of starting orthogonal frequency division multiplexing, OFDM, symbol and duration in OFDM symbols for a time-domain resource allocation, wherein the time-domain resource allocation table is selected from multiple different time-domain resource allocation tables based on the first information, and wherein the first information is distinct from information in the time-domain resource allocation field of the DCI.

2. The method of claim 1, wherein the first information comprises a Radio Network Temporary Identifier, RNTI.

3. The method of claim 1, wherein the first information comprises information indicating a search space related to a control channel used for the scheduling.

4. The method of claim 1, wherein the multiple time-domain resource allocation tables relate to time-domain resource allocation for physical downlink shared channel, PDSCH, scheduling.

5. The method of claim 1, wherein the multiple time-domain resource allocation tables comprise at least one of pre-defined tables with default values for the time domain resource allocation and radio resource control, RRC, configured tables.

6. The method of claim 1, wherein the base station further transmits a physical downlink shared channel, PDSCH, on a time-domain resource corresponding to the time-domain resource allocation entry indicated by the DCI.

7. The method of claim 1, further comprising: at the base station, transmitting the user data.

8. The method of claim 7, wherein the user data is provided at the host computer by executing a host application, the method further comprising: at the UE, executing a client application associated with the host application.

9. A host computer comprising:
processing circuitry configured to provide user data; and
a communication interface configured to initiate a transmission carrying the user data to a cellular network for transmission to a user equipment (UE),
wherein the cellular network comprises a base station operable to allocate a time-domain resource to a UE for a scheduled transmission in downlink, the base station comprising a radio interface, memory operable to store instructions and processing circuitry operable to execute the instructions, whereby the base station is operable to:
obtain first information available to both the UE and the base station, the first information comprising a Radio Network Temporary Identifier (RNTI); and
transmit a time-domain resource allocation field in a downlink control information, DCI, to the UE, the time domain resource allocation field indicating a time-domain resource allocation entry within a time-domain resource allocation table, the time domain resource allocation table being defined by a plurality of entries each specifying a different combination of starting orthogonal frequency division multiplexing, OFDM, symbol and duration in OFDM symbols for a time-domain resource allocation, wherein the time-domain resource allocation table is selected from multiple different time-domain resource allocation tables based on the first information, and wherein the first information is distinct from information in the time-domain resource allocation field of the DCI.

10. The host computer of claim 9, wherein the base station is further operable to transmit a physical downlink shared channel, PDSCH, on a time-domain resource corresponding to the time-domain resource allocation entry indicated by the DCI.

11. The host computer of claim 9, further including the base station.

12. The host computer of claim 11, further including the UE, wherein the UE is configured to communicate with the base station.

13. The host computer of claim 12, wherein:
the processing circuitry of the host computer is configured to execute a host application, thereby providing the user data to a client application associated with the host application and executing on the UE.

14. A method implemented by a host computer configured to operate in a communication system including a base station and a user equipment (UE), the method comprising:
at the host computer, providing user data associated with the UE; and
at the host computer, initiating a transmission carrying the user data to the UE via a cellular network comprising the base station, wherein the UE:
obtains first information available to both the UE and the base station,
selects a time-domain resource allocation table from multiple different time-domain resource allocation tables based on the first information, wherein a time domain resource allocation table is defined by a plurality of entries each specifying a different combination of starting orthogonal frequency division multiplexing, OFDM, symbol and duration in OFDM symbols for a time-domain resource allocation, determines a time-domain resource allocation entry within the selected time-domain resource allocation table based on a time-domain resource allocation field in a downlink control information, DCI, received from the base station, wherein the first information is distinct from information in the time-domain resource allocation field of the DCI, and receives the user data on a physical downlink shared channel, PDSCH, on a time-domain resource corresponding to the determined time-domain resource allocation entry.

15. The method of claim 14, wherein the first information comprises a Radio Network Temporary Identifier, RNTI.

16. The method of claim 14, wherein the first information comprises information indicating a search space related to a control channel used for the scheduling.

17. The method of claim 14, wherein the multiple time-domain resource allocation tables relate to time-domain resource allocation for physical downlink shared channel, PDSCH, scheduling.

18. The method of claim 14, wherein the multiple time-domain resource allocation tables comprise at least one of pre-defined tables with default values for the time domain resource allocation and radio resource control, RRC, configured tables.

19. A host computer comprising:
processing circuitry configured to provide user data; and
a communication interface configured to forward user data to a cellular network for transmission to a user equipment (UE),
the UE being operable to determine a time-domain resource allocated to the UE by a base station for a scheduled transmission in downlink, and the UE comprising a radio interface, memory operable to store instructions and processing circuitry operable to execute the instructions, whereby the UE is operable to:

obtain first information available to both the UE and the base station, select a time-domain resource allocation table from multiple different time-domain resource allocation tables based on the first information, wherein a time domain resource allocation table is defined by a plurality of entries each specifying a different combination of starting orthogonal frequency division multiplexing, OFDM, symbol and duration in OFDM symbols for a time-domain resource allocation, determine a time-domain resource allocation entry within the selected time-domain resource allocation table based on a time-domain resource allocation field in a downlink control information, DCI, received from the base station, wherein the first information is distinct from information in the time-domain resource allocation field of the DCI, and receive the user data on a physical downlink shared channel, PDSCH, on a time-domain resource corresponding to the determined time-domain resource allocation entry.

20. The host computer of claim 19, further including the UE.

21. The host computer of claim 20, wherein the cellular network further includes a base station configured to communicate with the UE.

22. The host computer of claim 19, wherein:
the processing circuitry of the host computer is configured to execute a host application, thereby providing the user data; and
the UE processing circuitry is configured to execute a client application associated with the host application.

* * * * *

UNITED STATES PATENT AND TRADEMARK OFFICE
CERTIFICATE OF CORRECTION

| | | |
|---|---|---|
| PATENT NO. | : 11,096,180 B2 | Page 1 of 1 |
| APPLICATION NO. | : 17/112275 | |
| DATED | : August 17, 2021 | |
| INVENTOR(S) | : Baldemair et al. | |

It is certified that error appears in the above-identified patent and that said Letters Patent is hereby corrected as shown below:

In the Specification

In Column 1, Line 8, delete "2020," and insert -- 2020, now Pat. No. 10,939,450, --, therefor.

In Column 1, Lines 32-33, delete "(PDCCH)/control channel resource set (CORESET)" and insert -- (PDCCH)/control resource set (CORESET) --, therefor.

In Column 7, Lines 62-63, delete "control channel resource sets (CORESETS)" and insert -- control resource sets (CORESETs) --, therefor.

In Column 37, Line 51, delete "in reaction" and insert -- in relation --, therefor.

Signed and Sealed this
Tenth Day of May, 2022

Katherine Kelly Vidal
*Director of the United States Patent and Trademark Office*